United States Patent [19]

Menninga

[11] Patent Number: 4,950,842
[45] Date of Patent: Aug. 21, 1990

[54] ELECTRICAL OUTLET SAFETY COVER

[76] Inventor: Mark E. Menninga, 3811 48th Pl., Des Moines, Iowa 50310

[21] Appl. No.: 354,777

[22] Filed: May 22, 1989

[51] Int. Cl.$^5$ .............................................. H02G 3/18
[52] U.S. Cl. ..................................... 174/67; 439/147; 439/305
[58] Field of Search .......................... 174/67; 220/242; 439/133, 135, 147, 305

[56] References Cited

U.S. PATENT DOCUMENTS

| | | | |
|---|---|---|---|
| 2,916,733 | 12/1959 | Hirsch | 340/280 |
| 4,530,555 | 7/1985 | South | 339/39 |
| 4,605,817 | 8/1986 | Lopez | 174/67 |
| 4,652,696 | 3/1987 | Winnick | 174/67 |
| 4,740,655 | 4/1988 | Ford | 174/67 |
| 4,851,612 | 7/1989 | Peckham | 174/67 |

Primary Examiner—Leo P. Picard
Assistant Examiner—David A. Tone
Attorney, Agent, or Firm—Morton S. Adler

[57] ABSTRACT

An electrical outlet safety cover includes an apertured base plate to replace the conventional face plate of an electrical outlet and is attached to such outlet at the original screw position. A box-like cover with openings for passage of an electric cord is provided for attachment to the base plate so as to enclose a cord attached to the outlet. The cord passes over a stop bar on the base plate in registration with the openings in the cover so that access to the outlet through the openings as, for example, by a child's finger or a tool is prevented. The cover and base plate include complementary locking members that coact when the cover is introduced to the base plate to effectively lock the cover to the base plate in a position where the locking members are completely enclosed by the cover and inaccessible from outside the cover so that the cover cannot be removed by manual manipulation. The locking member on the cover is constructed and adapted for movement in response to the presence of a magnetic force provided from outside of the cover to release it from engagement with the base plate and permit removal of the cover.

14 Claims, 2 Drawing Sheets

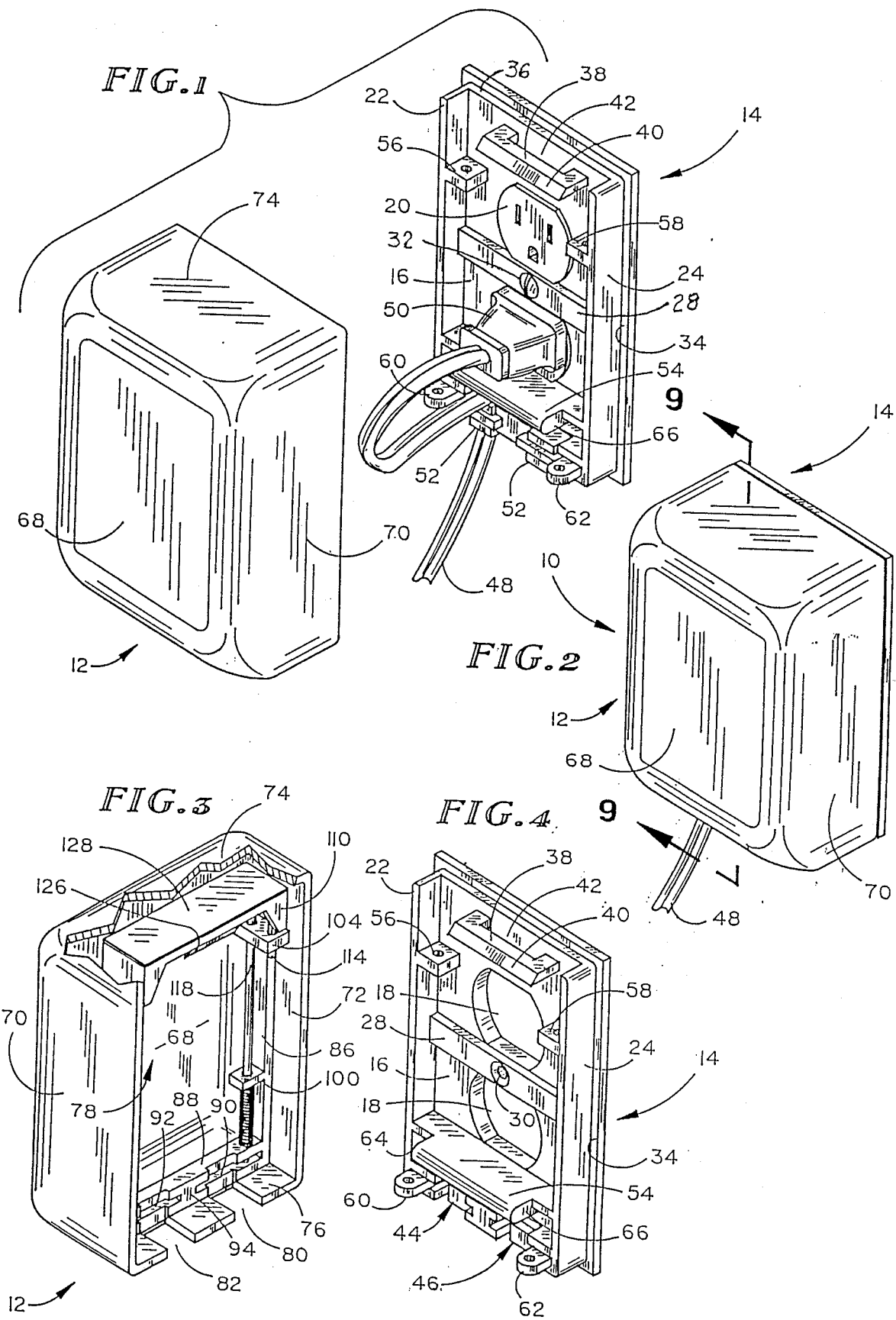

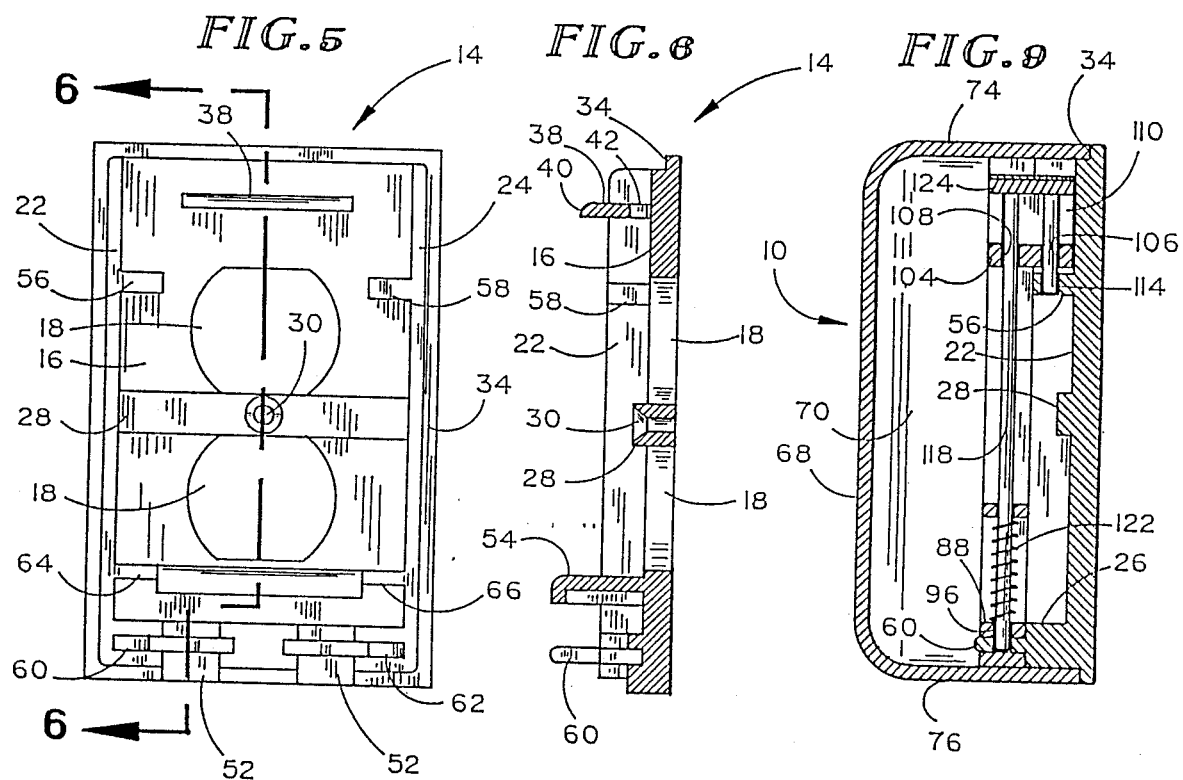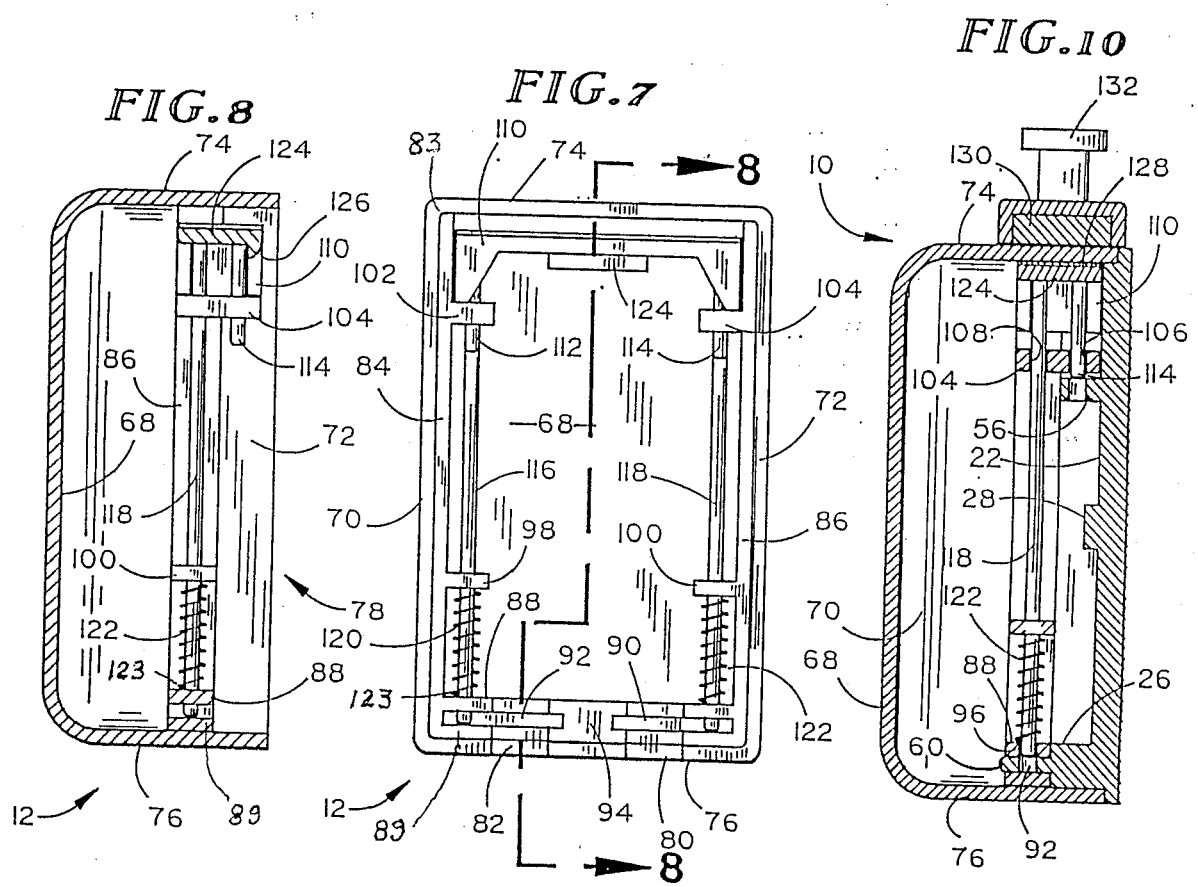

ELECTRICAL OUTLET SAFETY COVER

BACKGROUND OF THE INVENTION

The invention relates to improvements in a safety device for controlling access to an electrical outlet.

Such devices serve an obvious need particularly for preventing accidents and injuries to small children to whom a plugged-in-electric cord or open electrical outlet is a natural object of curiosity and investigation and many devices have been provided with this purpose in mind as exemplified in U.S. Pat. Nos. 2,716,733, 4,530,555, 4,470,655 and 4,652,696.

It has been observed that many of such prior devices emphazise the limits of dexterity and strength of small children and disclose various forms of a closure or cover for the outlet with various arrangements of latching means that have been designed with intricacies for the manner and form required to disengage the closure with the purpose that, because of the difficulties presented, the removal of the closure and resulting access to the outlet will be beyond the capabilities of small children and thus prevented. While such devices may serve their purpose with some children, there are many others whose ingenuity is such that mere difficulty in solving the workability of the latch mechanism will sooner or later be overcome by persistent efforts. A disadvantage which appears to be a common characteristic of such prior devices is that despite the intended difficulty of use, they are all capable of being operated merely by manual manipulation once the procedure is solved and thus do not accomplish their purpose for small children whose dexterity and strength may be greater than expected.

It has also been observed that devices designed to limit the access to an electrical outlet by small children can serve another important purpose of preventing accidental, inadvertent or intentional disconnection of an electric cord in situations where the connection should not be interrupted as, for example, where the connection is to an alarm system, a refrigerator, a freezer or the like. In these situations, whether caused by a small child or an adult and whether by accident, inadvertence or intentionally as a prank, such disconnection can affect the safety of a household or business or result in the spoilage of foods with the loss of the monetary value thereof. Alarm devices have been provided to signal the removal of a plug or outlet cover but these do not deny access to the outlet by small children or disconnection by accident and it is thus desirable that such a safety cover not be removable merely by manual manipulation dependent upon the dexterity of whomever attempts to do so or be susceptible of removal by accident or when not intended.

Accordingly, in view of the above obervations, it is one of the important objects herein to provide a safety cover for an electrical outlet, with or without a cord attached thereto, that once attached cannot be removed merely by manual manipulation.

More particularly, it is an object herein to provide a safety cover as characterized which includes a complementary base plate and cover with locking components that are inaccessible from outside the cover when the cover is attached but which are responsive to the presence of a magnetic force provided from outside of the cover for release to permit removal of the cover.

A further object is to provide a safety cover as characterized which prevents the removal thereof by accident or inadvertence.

Another object is to provide a safety cover of the above class which provides openings for the passage of the cord but prevents access to the electrical outlet through the openings.

SUMMARY

In accordance with the present invention, an electrical outlet safety cover includes an apertured base plate to replace the conventional face plate of an electrical outlet and is attached to such outlet at the original screw position. A box-like cover with openings for passage of an electric cord is provided for attachment to the base plate so as to enclose a cord attached to the outlet or the outlet itself. The cord passes over a stop bar on the base plate in registration with the cord openings in the cover so that access to the outlet through the openings as, for example, by a child's finger or a tool is prevented. The cover and base plate include complementary locking members that coact when the cover is introduced to the base plate to effectively lock the cover to the base plate in a position where the locking members are completely enclosed by the cover and inaccessible from outside the cover so the cover cannot be removed by manual manipulation. The locking member on the cover is constructed and adapted for movement in response to the presence of a magnetic force provided from outside of the cover to release it from engagement with the base plate and permit removal of the cover.

The foregoing objects and such further objects as may appear herein, or be hereinafter pointed out, together with the advantages of this invention will be more fully discussed and developed in the more detailed description of the accompanying drawings.

BREIF DESCRIPTION OF THE DRAWINGS

FIG. 1 is a perspective exploded view of an electrical outlet safety cover according to this invention, FIG. 2 is a reduced perspective view of this invention mounted to an electrical outlet, FIG. 3 is a perspective view, partially broken away, showing the interior of the cover, FIG. 4 is a perspective view of the base plate, FIG. 5 is an elevational view of the base plate, FIG. 6 is cross sectional view taken on the line 6—6 of FIG. 5, FIG. 7 is an elevational view of the interior of the cover showing the locking pins in locked position at the bottom, FIG. 8 is a cross sectional view taken on the line 8—8 of FIG. 7 showing the locking pins at both the top and bottom in locked position, FIG. 9 is a cross sectional view taken on the line 9—9 of FIG. 2 showing the cover locked to the base plate, and FIG. 10 is a view similar to FIG. 9 showing the application of a magnet to the exterior of the cover to effect its unlocked position for removal from the base plate.

DESCRIPTION OF THE PREFERRED EMBODIMENTS

Referring to the drawings, this electrical outlet safety cover is designated by the numeral 10 as best seen in FIG. 2 and includes generally a cover assembly 12 for lockable engagement with a base plate assembly 14

(FIG. 1) in a manner that is responsive to the presence of any suitable magnetic force introduced to the exterior of assembly 12 for unlocking the same as will later appear in the more detailed description which follows.

Base plate assembly 14, as best seen in FIG. 4, includes a preferably rectangular base plate 16 apertured as at 18 to replace the conventional face plate (not shown) for an electrical outlet 20 (FIG. 1). Plate 16 has the opposed sidewalls, 22, 24, a bottom wall 26 and a transverse central rib 28 provided with a hole 30 for screw 32 for attaching plate 16 to the outlets 20 at the original screw position as shown in FIG. 1. A circumscribing shoulder or ledge 34 on plate 16 is provided for use with the cover assembly 12 as will later appear.

Centrally mounted on plate 16 closely adjacent the upper end 36 thereof and above the uppermost outlet 20 (FIG. 4) is a horizontal cam bar 38 presenting the projecting bevelled edge 40 and provided with a notched portion 42 as shown. The bottom wall 26 is provided with spaced cutouts or notches 44, 46 for passage of an electric cord 48 from any attached plug 50 and into which conventional retaining plugs or closures 52 can be inserted as needed in a well known manner. On the lower portion of plate 16 below the lowermost outlet 20 is a transverse stop bar 54 extending between and outwardly from sidewalls 22, 24 in registration with cutouts 44, 46 and with this arrangement, cord 48 is trained over bar 54 and then under it to either cutout 44, 46 (FIG. 1) whereby bar 54 provides a barrier to access to outlet 20 through such cutouts as, for example, by a child's finger or a tool.

On the inner sides of sidewalls 22, 24 and in the upper portion of plate 16 approximately midway between rib 28 and the upper end 36 are the respective opposed apertured ears 56, 58 with another pair of respective apertured ears 60, 62 in the lower portion of plate 16 disposed to project outwardly from the bottom wall 26 adjacent such sidewalls. The outer opposed corners of the stop bar 54 are notched 64, 66 (FIG. 4) so as to not obstruct access to ears 60, 62 from above. It will be noted that with lower ears 60, 62 projecting as described, vertical lines through the respective axes thereof will be in a parallel relationship with vertical lines through the axes of the upper ears 56, 58 for reasons that will become apparent.

Reference is now made more particularly to FIGS. 3, 7, 8 for a description of the cover assembly 12 which includes a box-like cover of any material suitable for the passage of a magnetic force and defined by the integral back wall 68, sidewalls 70, 72, top 74, bottom wall 76 and open front 78 with the bottom wall 76 provided with spaced cutouts or notches 80, 82 to register with and complement cutouts 44, 46 in assembly 14 to provide openings for the passage of cord 48 as will become apparent in the operation of this device.

Thus far described, cover assembly 12 is designed to receive for permanent fixation a separately formed locking mechanism mounted on a generally U-shaped frame 83 as follows. Frame 83 (FIG. 7) is formed by opposed spaced elongated vertical sides 84, 86 secured together at their bottom ends by the parallel vertically spaced transverse bars 88, 89 which are correspondingly notched to provide the through openings 90, 92 on opposite sides of a central post or stud 94 that connects bars 88, 89 for rigidity. The ends of bar 88 adjacent the respective sides 84, 86 are apertured 96 as best seen in FIGS. 9, 10 in a position to register with the apertures in the respective ears 60, 62 in assembly 14. Opposed apertured ears 98, 100 extend inwardly from the lower portion of respective sides 84, 86 with the apertures therein disposed to register with the respective apertures 96 in bar 88. Spaced above ears 98, 100 respective opposed ears 102, 104 extend inwardly from sides 84, 86 and are each provided with spaced apertures 106, 108 (FIG. 9, 10) and for purposes of description, 106 is referred to as the front aperture and 108 as the rear aperture.

A top plate or bar 110 extends between but not attached to sides 84, 86 in closely spaced relationship to top 74 and at each end carries the respective depending stub pins or shafts 112. 114 that are slidably journalled through the respective front apertures 106 of ears 102, 104. Also, bar 110 at each end carries the respective depending elongated pins or shafts 116, 118, parallel to stub pins 112, 114, and slidably journalled through the respective rear apertures 108 of ears 102, 104, through the respective lower ears 98, 100 and through the apertures 96 in bar 88 into the respective openings 90, 92. Pins 116, 118 are spring loaded 120, 122 between bar 88 and ears 98, 100 and are normally biased in their downwardmost position seen in FIG. 4 where the stub pins 112, 114 extend below ears 102, 104 and the lower ends of pins 116, 118 extend into openings 90, 92. Springs 120, 122 are anchored at their lower ends at 123 to pins 116, 118 in any suitable manner. A cam bar 124 depends centrally from the underside of top bar 110 and is provided with a bevelled lip 126 (FIG. 8) oriented towards the front 78 of assembly 12. A thin strip of metal 128 is preferably secured to the top of top bar 110 but bar 110, itself, can be of metal, if desired, or otherwise adapted to be susceptible to magnetic attraction. With frame 83 provided with the locking components as described, it is introduced to cover assembly 12 so that the respective sides 84, 86 abut the respective cover walls 70, 72 and bar 89 is seated on bottom wall 76 as best seen in FIG. 7, and preferably is secured to cover assembly 12 by a suitable adhesive so that, in effect, it becomes an integral part of the cover 12 for use.

OPERATION

With the base plate 16 attached to the outlets 20 as described, and with a cord 48 and plug 50 in place as seen in FIG. 1, or without such a cord and plug if the outlet is not being used at the time, the cover assembly 12 is attached to the base plate assembly 14 as follows. At this point, the position of the components parts of frame 83 are best seen in FIGS. 7, 8 where the stub pins 112, 114 are slidably journalled downwardly through the front apertures 106 of the respective ears 102, 104 and the elongated pins 116, 118 are slidably journalled through the rear apertures 108 of ears 102, 104, through the respective lower ears 98, 100 and through the apertures 96 in bar 88 into the openings 90, 92 to about bar 89 and are normally held in this position by the springs 120, 122.

In this position, cover assembly 12 is introduced to the base plate assembly 14 so that the bevelled lip 126 on cam bar 124 engages and rides up and over the bevelled edge 40 of cam bar 38 to move top bar 110 to its upwardmost position and correspondingly move pins 112, 114 and 116, 118 upwardly where the lower ends of pins 112, 114 are within the confines of ears 102, 104 and the lower ends of pins 116, 118 are moved out of passageways 90, 92 to within the confines of bar 88. As this occurs, ears 102, 104 on the cover assembly 12 will move into juxtaposition with the top surface of ears 56, 58 in the base plate assembly 14 so that the front apertures 106 on ears 102, 104 are in registration with the respective apertures in ears 56, 58. Also, at the same time, as the bottom of cover assembly 12 is mated with the bottom of the base plate assembly 14, ears 60, 62 on assembly 14 will move into the respective openings 90, 92 where the apertures in ears 60, 62 will register with the apertures 96 in bar 88 that are in registration with the path of movement of the elongated pins 116, 118. When the cover is fully in place with its edges resting on ledge 34 (FIG. 2), the lip 126 on cam bar 124 will seat in notch 42 of cam bar 38 to release tension on springs 120, 122 whereby pins 112, 114 and 116, 118 will return to their normal or extended position in which pins 112, 114 will be journalled through ears 102, 104 for locking engagement and pins 116, 118 will be journalled through ears 60, 62 for locking engagement as best seen in FIG. 9. If a cord 48 and plug 50 are attached to outlet 20, the cord 48 is trained over the edge of the stop bar 54 as seen in FIG. 1 and through one of the openings 44, 46 which are complemented by the cutouts 80, 82 of the cover assembly 12. The purpose of bar 54 is to prevent access to outlet 20 through the cord passageways as, for example, by a child's finger or a tool.

The assembled safety cover 10 is shown in FIG. 9 where it will be seen as a complete closure for outlet 20 and since all of the locking components are completely enclosed within the locked cover, there is no means available on the outer surface at any point to manipulate for the purpose of removing the cover. The cover assembly 12 is effectively locked to the base plate assembly 14 in the upper portion by the stub pins 112, 114 and the lip 124 and at the lower portion by the pins 116, 118 so that it has no unsecured areas and thus for all practical purposes cannot be removed by a child, or adult, by mere manual manipulation.

The removal of cover assembly 12 from the base plate assembly 14 is accomplished by providing the presence of a magnetic force adjacent top 74 to react with the metal strip 128 on top plate 110 and a variety of magnets for such purpose are readily available. An example of such a magnet 130 attached to a handle 132 is illustrated in FIG. 10. By applying magnet 130 to top 74, top plate 110 is moved to its upwardmost position best seen in FIG. 10 where the pins 112, 114 and 116, 118 are retracted out of locking engagement with the base plate assembly 14 and the cover can then be easily lifted free of the base plate assembly 14. Since it is well known that most households have a variety of relatively small magnet holders for attaching to refrigerators and the like to hold messages, pictures and other items and which would be readily available to children, I have designed this safety cover to require a magnetic force for opening the cover which is greater than that provided by the run of the mill magnets referred to whereby the magnet needed to remove this cover assembly can be kept in a place not accessible to small children and not conveniently available for otherwise unauthorized persons.

From the standpoint of protecting small children, this invention has a decided advantage over prior devices for such purpose which depend upon the lack of dexterity of a child to manipulate an exposed latch or lock component since the present invention does not provide any such components upon which the child can test his or her dexterity. In addition, this safety cover prevents accidental removal of a plug when not intended such as to a refrigerator, freezer, alarm system or the like and also prevents inadvertent or intentional meddling with the cover. Accordingly, in view of the foregoing, it is thought a full understanding of the construction and operation of this invention will be had and the advantages of the same will be appreciated.

I claim:
1. An electrical outlet safety cover, comprising:
   an apertured base plate to replace the conventional face plate on an electrical outlet,
   a first locking member on said base plate
   a box-like cover for encasing said base plate and that portion of an electric cord connected to the electrical outlet,
   a second locking member on the interior of said cover,
   said first and second locking members coacting when said cover is introduced to said base plate to effectively lock said cover to said base plate in a position where said locking members are completely enclosed by said cover and inaccessible from outside of said cover so that said cover cannot be removed by manual manipulation, and
   said second locking member constructed and adapted for movement in response to the presence of a magnetic force provided from outside of said cover to release said locking members and permit removal of said cover.
2. A device as defined in claim 1 including a metal means associated with said second locking member and disposed in close proximity to the inside of said cover.
3. A device as defined in claim 1, including:
   said cover provided with an opening for passage of an electric cord attached to the electrical outlet, and
   a stop bar on said base plate disposed to be intermediate said opening and the electrical outlet and adapted to permit passage of a cord through said opening but which prevents access to said outlet through said opening from exteriorly of said cover.
4. An electrical outlet safety cover, comprising:
   an apertured base plate to replace the conventional face plate of an elecrical outlet,
   a box-like cover for encasing said base plate and that portion of an electric cord connected to the electrical outlet,
   a locking means comprising:
      a fixed lock member on said base plate,
      a spring-loaded lock member mounted to the interior of said cover,
      said spring-loaded lock member lockably engaging said fixed lock member when said cover is introduced to said base plate to effectively lock said cover to said base plate in a position where said locking means is within the confines of said cover and inaccessible from outside said cover so that said cover cannot be removed by manual manipulation, and
   said spring-loaded lock member being constructed and adapted for movement in response to the presence of a magnetic force provided from outside of said cover to release the same from said fixed lock member and permit removal of said cover.
5. A device as defined in claim 4 including: said fixed lock member being an apertured ear, and said spring-loaded lock member being a pin.
6. A device as defined in claim 5, including:
   said pin being normally in extended position,
   a first cam on said base plate and a second cam associated with said pin, and said cams coating when said cover is introduced to said base plate to retract said pin until it registers with and engages said ear.

7. A device as defined in claim 4 including a metal means associated with said spring-loaded lock member and disposed in close proximity to the inside of said cover.

8. A device as defined in claim 4, including:
said cover provided with an opening for passage of an electric cord attached to the electrical outlet, and
a stop bar on said base plate disposed to be intermediate said opening and the electrical outlet to permit passage of a cord through said opening but which prevents access to the outlet through said opening from exteriorly of said cover.

9. An electrical outlet safety cover, comprising:
an apertured base plate to replace the conventional face plate of an electrical outlet and to be attached thereto at the conventional screw position,
said base plate defining respective upper and lower positions,
first respective locking means in said upper and lower portions,
a box-like cover for encasing said base plate and that portion of an electric cord connected to the electrical outlet,
said cover defining respective upper and lower portions complementary with said upper and lower portions on said base plate,
second respective locking means in said upper and lower portions of said cover,
said first and second locking means coacting when said cover is introduced to said base plate to effectively lock said cover to said base plate in a position with said respective locking means inaccessible from outside said cover whereby said cover cannot be removed by manual manipulation, and
said second locking means constructed and adapted for movement in response to the presence of a magnetic force provided from outside of said cover to release the same and permit removal of said cover.

10. A device as defined in claim 9 including a thin strip of metal associated with said second locking means and disposed in close proximity to the inside of said cover.

11. A device as defined in claim 9, including:
said first locking means comprising respective upper and lower apertured ears, and
said second locking means comprising a movable pin for engagement with one of said ears and operably connected to a spring-loaded pin engageable with the other of said ears.

12. A device as defined in claim 11 in which said movable pin engages said upper ear and said spring-loaded pin engages said lower ear.

13. A device as defined in claim 11, including:
said spring-loaded pin normally being in extended position,
a first cam on said base plate and a second cam associated with said second locking means, and
said cams coacting when said cover is introduced to said base plate to retract said spring-loaded pin and effect movement of said movable pin until said pins register with and lockably engage said respective ears in said base plate.

14. A device as defined in claim 9, including:
said cover provided with an opening for passage of an electric cord attached to the electrical outlet, and
a stop bar on said base plate disposed to be intermediate said opening and the electrical outlet to permit passage of the cord through said opening but which prevents access to the outlet through said opening from exteriorly of said cover.

* * * * *